I. DENHAM.
Wheel-Cultivator.
No. 50,229.  Patented Oct. 3, 1865.
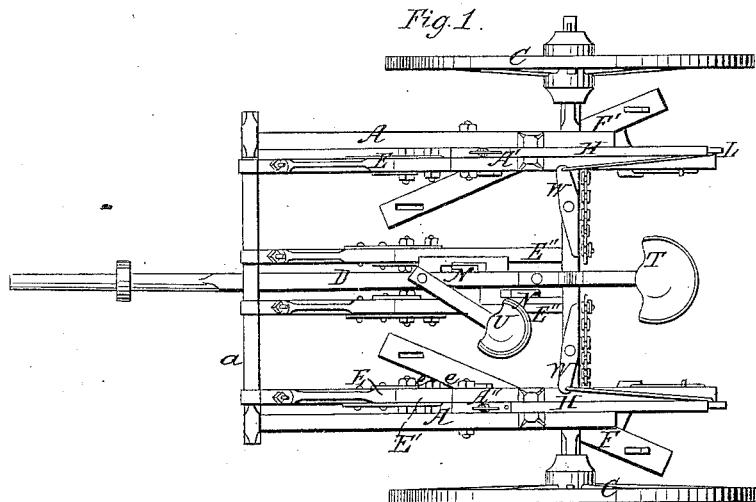
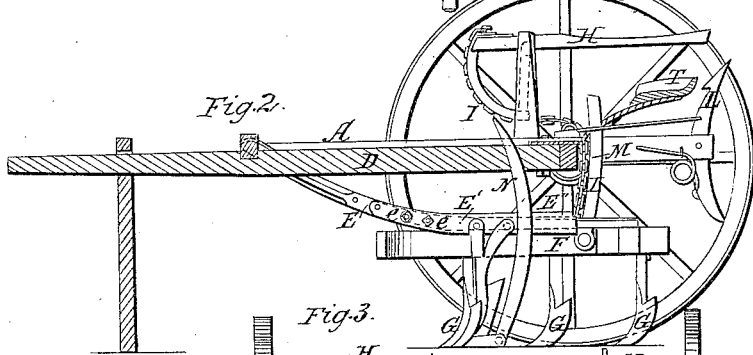
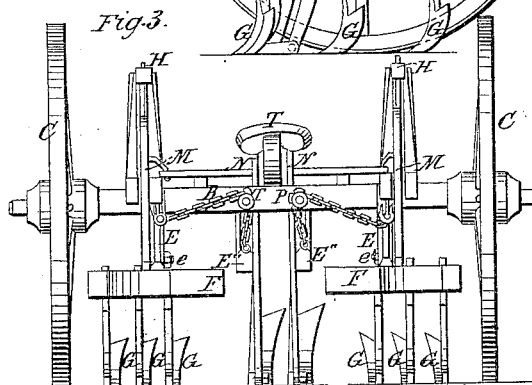

UNITED STATES PATENT OFFICE.

ISAAC DENHAM, OF LANESFIELD, KANSAS.

IMPROVEMENT IN CULTIVATORS.

Specification forming part of Letters Patent No. 50,229, dated October 3, 1865.

*To all whom it may concern:*

Be it known that I, ISAAC DENHAM, of Lanesfield, in the county of Johnson and State of Kansas, have invented a new and useful Machine Combining a Plow, Corn-Planter, and Cultivator; and I do hereby declare the following to be a full, clear, and exact description of the nature, construction, and operation of the same, reference being had to the annexed drawings, making part of this specification, in which—

Figure 1 is a plan view. Fig. 2 is a central vertical longitudinal section. Fig. 3 is a rear view. Fig. 4 is a detached view of the portion which, attached when required as a substitute for the plow and cultivator, performs the office of a corn-planter.

The same letters refer to like parts in the different figures.

My invention consists in the manner of adapting the machine, by the change of parts, to perform the different operations required in the course of putting in and tending a crop of corn—namely, plowing, planting, and cultivating; and the improvement does not consist in any special improvement in the devices themselves, but in the manner of arranging and combining them to adapt the machine to the change of work.

To enable an implement-maker or farmer, to whom, in their several capabilities as constructor and operator, my specification is addressed, to construct and use the same, I will proceed to describe it.

A is a frame, supported upon an axle, B, and wheels C. The tongue D is centrally disposed, is inserted into the axle, and supports the forward bar, a, of the frame, which bar is the forward point of draft of the plow-beams E, which are pivoted thereto and have a vertical adjustment by means to be described.

Though not the first in order of time as regards the season of its use, there can be no particular impropriety in describing the machine first as a cultivator, as represented in black lines in Figs. 1, 2, and 3. In this case an oblique beam, F, is attached to each plow-beam E, and is provided with shares G G, so arranged on each side of the central line as to throw the soil toward the corn, which is straddled by the machine. The lowering of these shares to the required depth in the soil or the raising of them above the contact of the ground is performed in each case by means of a hand-lever, H, and cord I, which passes over an arc-shaped arm, J, and rollers K K', and is attached to the plow-beam E, so as, by the elevation or depression of the lever H, to affect the vertical height of the plow-beam. When elevated above their working position they are retained by the triggers L L, which are so actuated by springs as to cause their notches to engage the ends of the levers and retain them in position. In these vertical movements the plow-beam is guided by the post M, which projects upward between the pieces A and A' of the frame.

When it is desired to detach the cultivating apparatus and attach the plows the cultivator plow-beams E' are unfastened by unscrewing the clevis-bolts e. The beams E'' (shown in red lines in the Figs. 1, 2, and 3) are then attached in the place of the cultivator-beams removed, and the beams E slipped up toward the tongue, so as to occupy a place on each side of the tongue. In this condition their posts N N traverse slots on each side of the tongue, as shown in the plan, Fig. 1, and the vertical height of the plow-beam is adjusted as in the former case, excepting that the chain which forms the connection between the lever and the beam is carried over the roller P, Fig. 3, so as to bring it vertically above the plow-beam to which it is attached and upon which it is to operate.

To change the machine to a planter the frame and attached seed-boxes, &c., (represented in Fig. 4,) are attached in place of the oblique frames carrying the cultivator-shovels. The frame O, Fig. 4, being attached by its forward ends to the beams E, is supported at their rear by the rollers R R, and the handle S enables the person who sits on the rear seat, T, to manipulate the seeding device, while the driver, on seat U, attends to the team. The forward share of the seeding-frame opens the drill, the seed then drops into it as the handle S is vibrated, the following shares cover it, and the flattening-roller smooths and presses the ground above it, so as to place it in a favorable condition for sprouting and for being readily seen and tended when it comes up.

The triggers L L are withdrawn, so as to drop the plows to their work as required, by pressure of the feet upon the inner ends of the levers W W.

Having thus described my invention, what I claim as new, and desire to secure by Letters Patent, is—

The arrangement and combination of the several parts, substantially as described, in their relation to the frame and running-gear, whereby the machine is adapted to the different kinds of work, as explained.

Given under my hand and seal this 15th day of December, A. D. 1864.

ISAAC DENHAM. [L. S.]

In presence of—
  WILLIAM ROY,
  JOHN E. CLARK.